United States Patent
Diefenbaugh et al.

(10) Patent No.: US 7,490,255 B2
(45) Date of Patent: Feb. 10, 2009

(54) POWER EFFICIENT FLOW CONTROL MODEL FOR USB ASYNCHRONOUS TRANSFERS

(75) Inventors: Paul Diefenbaugh, Portland, OR (US); John Howard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 404 days.

(21) Appl. No.: 11/428,266

(22) Filed: Jun. 30, 2006

(65) Prior Publication Data
US 2008/0005445 A1    Jan. 3, 2008

(51) Int. Cl.
G06F 1/32 (2006.01)
G06F 13/00 (2006.01)

(52) U.S. Cl. ........ 713/320; 710/100
(58) Field of Classification Search ........ 713/320; 710/100
See application file for complete search history.

(56) References Cited

U.S. PATENT DOCUMENTS

| | | | |
|---|---|---|---|
| 5,517,650 A | 5/1996 | Bland et al. | |
| 6,067,591 A | 5/2000 | Howard et al. | |
| 6,389,501 B1 | 5/2002 | Garney et al. | |
| 6,606,674 B1 | 8/2003 | Howard | |
| 6,678,761 B2 | 1/2004 | Garney | |
| 6,684,272 B1 | 1/2004 | Hosler et al. | |
| 6,701,399 B1 * | 3/2004 | Brown | 710/114 |
| 6,721,815 B1 * | 4/2004 | Leete | 710/6 |
| 6,748,465 B2 | 6/2004 | Howard et al. | |
| 6,771,664 B1 | 8/2004 | Garney et al. | |
| 6,792,495 B1 | 9/2004 | Garney et al. | |
| 6,813,251 B1 | 11/2004 | Garney et al. | |
| 6,912,605 B1 | 6/2005 | Wright | |
| 6,952,429 B2 | 10/2005 | Garney et al. | |
| 7,007,110 B2 | 2/2006 | Howard | |
| 7,007,119 B2 | 2/2006 | Howard et al. | |
| 7,028,124 B2 | 4/2006 | Leete et al. | |
| 7,131,035 B2 * | 10/2006 | Gulick et al. | 714/34 |
| 7,194,583 B2 * | 3/2007 | Hesse et al. | 711/137 |
| 7,213,096 B2 | 5/2007 | Keys et al. | |
| 7,228,366 B2 | 6/2007 | Abramson | |
| 7,281,074 B2 | 10/2007 | Diefenbaugh et al. | |
| 7,340,550 B2 | 3/2008 | Derr et al. | |
| 2003/0163627 A1 | 8/2003 | Deng et al. | |

(Continued)

FOREIGN PATENT DOCUMENTS

WO    WO-2004/002958 A2    1/2007

OTHER PUBLICATIONS

"Advanced Configuration and Power Interface Specification (Revision 2.0b)", Compaq Computer Corporation, Intel Corporation, Microsoft Corporation, Phoenix Technologies Ltd., Toshiba Corporation, (Oct. 11, 2002), 502 pgs.

(Continued)

Primary Examiner—Rehana Perveen
Assistant Examiner—Eric Chang
(74) Attorney, Agent, or Firm—Schwegman, Lundberg & Woessner, P.A.

(57) ABSTRACT

Embodiments comprising a memory and a USB host controller coupled to the memory. The power efficiency of a USB during asynchronous transfers is increased by limiting usage of an asynchronous schedule stored in the memory when servicing a scheduled asynchronous transfer endpoint. Other embodiments may be described and claimed.

28 Claims, 5 Drawing Sheets

U.S. PATENT DOCUMENTS

| | | |
|---|---|---|
| 2004/0073697 A1 | 4/2004 | Saito et al. |
| 2004/0193715 A1 | 9/2004 | Froelich et al. |
| 2004/0268010 A1 | 12/2004 | Garney et al. |
| 2005/0033892 A1 | 2/2005 | Garney et al. |
| 2005/0289363 A1 | 12/2005 | Tsirkel et al. |
| 2006/0067280 A1 | 3/2006 | Howard et al. |
| 2006/0072487 A1 | 4/2006 | Howard |
| 2006/0218423 A1 | 9/2006 | Diefenbaugh et al. |
| 2006/0294400 A1 | 12/2006 | Diefenbaugh et al. |
| 2007/0005824 A1 | 1/2007 | Howard |
| 2007/0005859 A1 | 1/2007 | Diefenbaugh et al. |
| 2007/0005987 A1 | 1/2007 | Durham et al. |
| 2007/0005995 A1 | 1/2007 | Kardach et al. |
| 2007/0006000 A1 | 1/2007 | Jain et al. |
| 2007/0008887 A1 | 1/2007 | Gorbatov et al. |
| 2007/0079154 A1 | 4/2007 | Diefenbaugh et al. |

OTHER PUBLICATIONS

"Universal Serial Bus Specification", *Revision 2.0, The Universal Serial Bus Implementation Forum* (*USB-IF*), (Portland, OR), (Apr. 27, 2000), 622 pgs.

"Universal Serial Bus Specification", *Revision 2.0, The Universal Serial Bus Implementation Forum* (*USB-IF*), (Apr. 27, 2000), 154-157.

Anderson, D., et al., "Chapter 9—USB Power Conservation", *Universal Serial Bus System Architecture*, (Second Edition), Mind Share, Inc., Addison Wesley Professional, (Mar. 2001), 195-209.

"U.S. Appl. No. 11/170,771 Response filed Dec. 20, 2007 to Non Final Office Action mailed Sep. 20, 2007", (Dec. 20, 2007),14 pgs.

"U.S. Appl. No. 11/170,771 Non Final Office Action mailed Apr. 15, 2008", 17 pgs.

"U.S. Appl. No. 11/170,771 Non Final Office Action mailed Sep. 20, 2007", 12 pgs.

* cited by examiner

POWER EFFICIENT FLOW CONTROL MODEL FOR USB ASYNCHRONOUS TRANSFERS

CROSS-REFERENCE TO RELATED APPLICATIONS

This application is related to the following co-pending, commonly assigned U.S. patent application Ser. No. 11/171,833, by Diefenbaugh et al., entitled "Method and Apparatus to Quiesce USB Activities Using Interrupt Descriptor Caching and Asynchronous Notifications," filed Jun. 29, 2005, and Ser. No. 11/170,771, by Howard, entitled "Enhancements to Universal Serial Bus (USB) Suspend and Resume Operations," filed Jun. 29, 2005.

BACKGROUND

Electronic devices such as computers are often interconnected to peripheral devices to communicate data. Examples of peripheral devices include a keyboard, a mouse, a memory device, and a printer. A Universal Serial Bus (USB) is often used to communicate data between a host processor and peripheral devices. A USB host controller manages the transfer of data over a USB bus to downstream USB devices.

Power management of the interconnected devices is becoming more of a concern as computers implement mobile system platforms where the computers and devices are battery powered. While a USB is quite effective at moving large amounts of data very quickly, it can be relatively inefficient with respect to power consumption. One reason for this inefficiency is the USB host controller's reliance on main memory for virtually all of its operational state and the distribution of the operational state across comparatively small non-contiguous data structures in the main memory, which requires the USB host controller to frequently access data transfer schedule structures in the main memory. Another reason is the inability for USB devices to asynchronously notify the USB host controller upon meaningful events, such as when the device is ready to transfer data.

The present inventors have recognized a need for improvement in USB communications, particularly in making USB asynchronous data transfers more power efficient.

DETAILED DESCRIPTION

In the following detailed description, reference is made to the accompanying drawings which form a part hereof, and in which is shown by way of illustration specific embodiments in which the invention may be practiced. It is to be understood that other embodiments may be used, and structural and logical changes may be made without departing from the scope of the present invention.

This document describes systems and methods to enhance communications involving a USB. USB host controllers are designed to optimize data throughput. USB-enabled devices connecting to the bus typically have data rates that do not require the maximum throughput capability of the bus. Data flow control operations of a USB are conducted in-band with the data signaling, assuming that asynchronous events such as device-initiated interrupts are defined or provided. This has lead to a model where the USB host controller is required to poll a USB device to determine whether the device is ready to move data.

Figure 1:
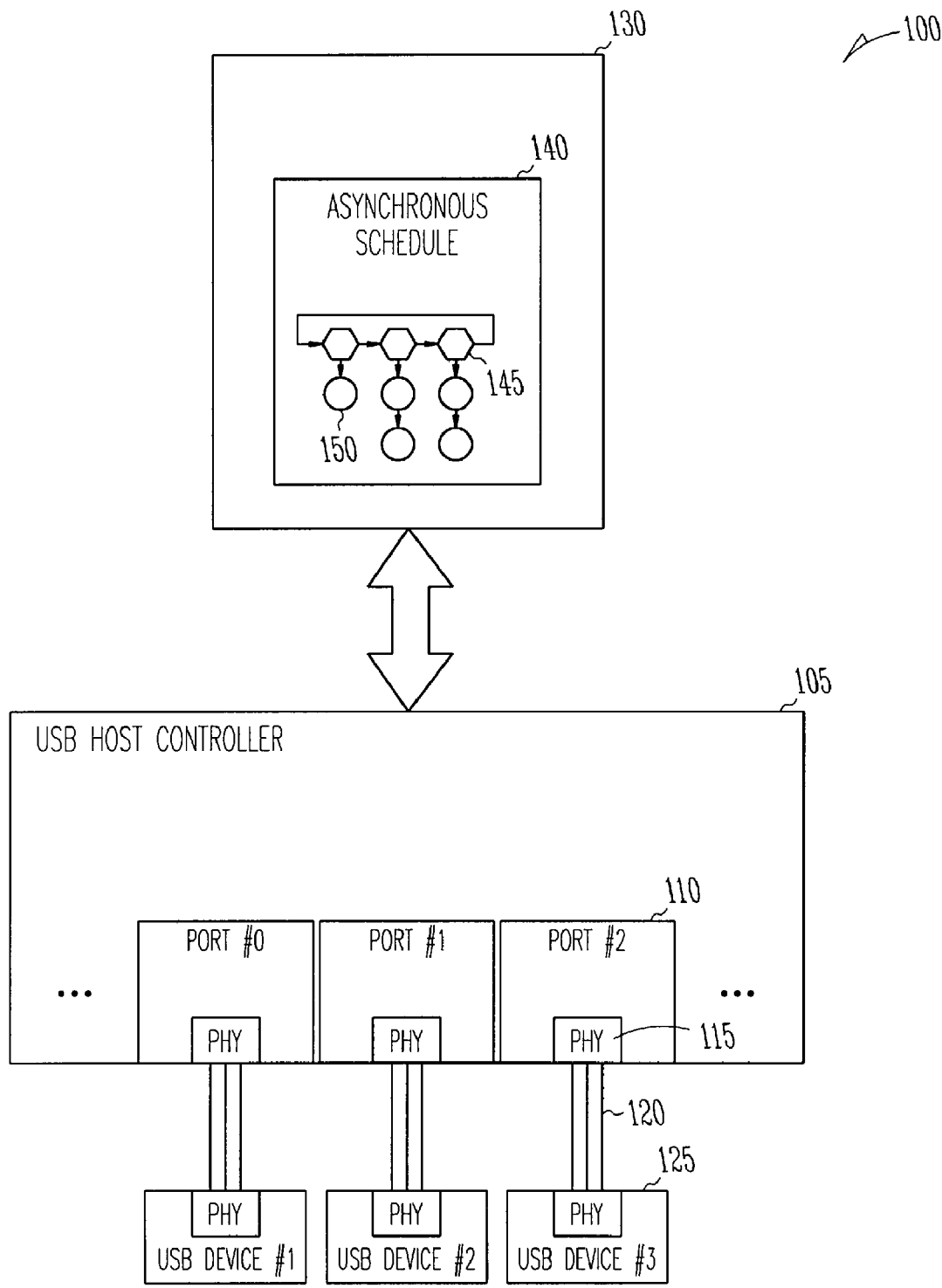
FIG. 1 is a block diagram of portions of a device that supports a Universal Serial Bus (USB).

FIG. 1 is a block diagram of portions of a device 100 that supports a USB. The device 100 includes a USB host controller 105 and one or more USB ports 110. A USB port 110 includes a physical layer 115 (PHY) for communicating data over a link 120 between the USB port 110 and a USB device 125.

Four transfer types are defined in USB protocol specification revision 2.0 (hereinafter "USB 2.0 protocol"): interrupt, isochronous, bulk, and control transfers. For the Enhanced Host Controller Interface (EHCI) implementation of a USB host controller 105, the interrupt and isochronous transfers are serviced according to a periodic schedule (not shown) stored in main memory 130. Bulk and control transfers are serviced according to an asynchronous schedule that is also stored in main memory 130. Although the examples are described in view of the EHCI implementation of a USB host controller 105, the systems and methods described can be applied to other USB host controller 105 implementations such as an open host controller interface (OHCI), a universal host controller interface (UCHI), or to other implementations of a serial bus controller, although the details of the implementations will differ slightly.

Bulk transfers are designed to support devices that need to communicate relatively large amounts of data at variable times, such as a memory or a networking device, for example. A bulk transfer can use any available bandwidth, and data is guaranteed to be delivered, but with no guarantee of bandwidth or latency. Control transfers are generally used for configuring devices, such as after a USB device 125 signals it has been connected and reset, for example. The USB host controller 105 generally services the asynchronous transfers when they occur using the channel bandwidth remaining after the periodic transfers.

The asynchronous schedule 140 may be a simple circular linked list of schedule work items that provides a round-robin service opportunity for all asynchronous transfers. The schedule work items include one or more queue heads 145. Each queue head 145 represents a single bulk or control transfer corresponding to an endpoint. An endpoint is a logical entity residing on a USB device 125 requiring service. In some embodiments, a queue head 145 includes zero or more transfer descriptors 150 associated with it, using another linked list structure. Each transfer descriptor 150 represents a discrete amount of work (i.e., data to either transmit to, or receive from, a specific endpoint using one or more transactions) to occur over USB link 120.

The USB host controller 105 traverses the circular linked list of queue heads 145 and executes a small number (typically one) of transactions associated with a queue head 145. The USB host controller 105 will continue traversal of the circular linked list until: i) no transactions were executed during the last traversal of the circular linked list; ii) the start of a new micro-frame occurs which switches processing by the USB host controller 105 over to the periodic transfer schedule; or iii) software disables the asynchronous schedule 140. Typically, USB host controllers 105 consult the asynchronous schedule 140 in main memory 130 to discover and execute transactions. To optimize data throughput, the asynchronous schedule 140 is parsed frequently (e.g., every ten to twenty microseconds (μsec)).

As the circular link list is traversed, transactions are executed on the bus and an endpoint that is not currently ready to consume data will return a not ready (NAK) response for Bulk-IN and PING transactions or a NYET signal for a Bulk-OUT transaction. The schedule architecture and traversal rules described above lead to frequent transactions to an endpoint with commensurate NAK (or NYET) responses. The endpoint will be repeatedly polled at the rate of once per list traversal until it delivers all of its data even though the endpoint may NAK transactions for long periods of time.

Structures in the asynchronous schedule 140 often persist for long periods of time relative to the host controller's internal operation. For example, a driver for a USB device 125 may create a pair of Bulk-IN and Bulk-OUT queue heads 145 and transfer descriptors 150 when the device adapter is enabled (e.g., when a network cable is plugged-in, or the adapter is associated with a wireless access point such as a Bluetooth adapter and is enabled). Transfer descriptors 150 are typically modified (e.g., by retiring completed transfer descriptors 150 or by adding new transfer descriptors 150) only when data is actively flowing, and the host controller may execute transactions from each transfer descriptor 150 many thousands of times before it is successfully completed.

The result of servicing the asynchronous schedule 140 is the frequent accessing of main memory 130 by the USB host controller 105 to schedule data structures. This is true even if pauses are injected during intervals such as when all queue heads 145 are inactive or during each Start of Frame (SOF). In some embodiments, the polling rate of the USB host controller 105 is quite aggressive (e.g., <10 μs) in order to accommodate USB devices 125 that require maximum responsiveness and throughput.

The USB 2.0 protocol is effective in moving large amounts of data. The USB 2.0 protocol provides a simple flow control mechanism where a USB device 125 simply responds with a NAK response to a transaction and leaves the decision about when to retry to the USB host controller 105. A USB host controller 105 typically attempts to resume the data stream by issuing another request to move data at the earliest opportunity (e.g., the very next transaction on the bus). Bulk transfers generally use short bursts over an extended period of time to transfer large quantities of data. Most USB networking and mass storage devices rely entirely on the bulk transfer type to move data.

However, mismatches occur between the available bandwidth of the USB host controller 105 and the USB device 125. The USB 2.0 protocol does not provide a mechanism for USB devices 125 to asynchronously notify a USB host controller 105 that data is ready for transfer or space is available to accept data. This results in long periods where USB host controller 105 repeatedly polls USB devices 125 to determine when they are ready to either produce (e.g., Bulk-IN) or consume (e.g., Bulk-OUT) data. This polling results in multiple accesses to the main memory 130 by the USB host controller 105 for such tasks as reading from the asynchronous schedule 140 and to writing back the status of the transfer. These periods of high transaction activity that have little or no real data being transferred can lead to inefficiencies in power consumption by the USB host controller 105.

Frequent polling improves the responsiveness of the system and reduces the amount of buffering (data storage) required on the device. However, a USB device with a low data transfer rate or having an indeterminate time of data arrival (such as a networking device) may respond to multiple polling requests with a not ready or NAK response until it is ready to move data. These cycles of polling requests and not ready responses result in inefficiencies in the platform with respect to power consumption.

This constant background activity related to the frequent polling of USB devices 125 and the frequent access to main memory 130 by USB host controllers 105 not only causes more power to be consumed by the USB host controller 105, USB ports 110, and USB devices 125, but often defeats other power reduction schemes implemented in the host computer. Although this reliance on main memory 130 is the cause of many power management issues, it is so fundamental to the architecture that any major change to the role of the USB host controller 105 or main memory 130 would negatively impact the existing software infrastructure.

By providing a more power efficient USB bus, the battery life of mobile devices such as mobile personal computers (PCs) can be improved. However, it is desirable that any change to the implementation be compatible with existing USB protocols. In addition, any solution to reduce the amount of background activity should preserve the responsiveness and throughput of a serial bus when needed, but operate much more efficiently when data is not actively moving on the bus.

Figure 2:
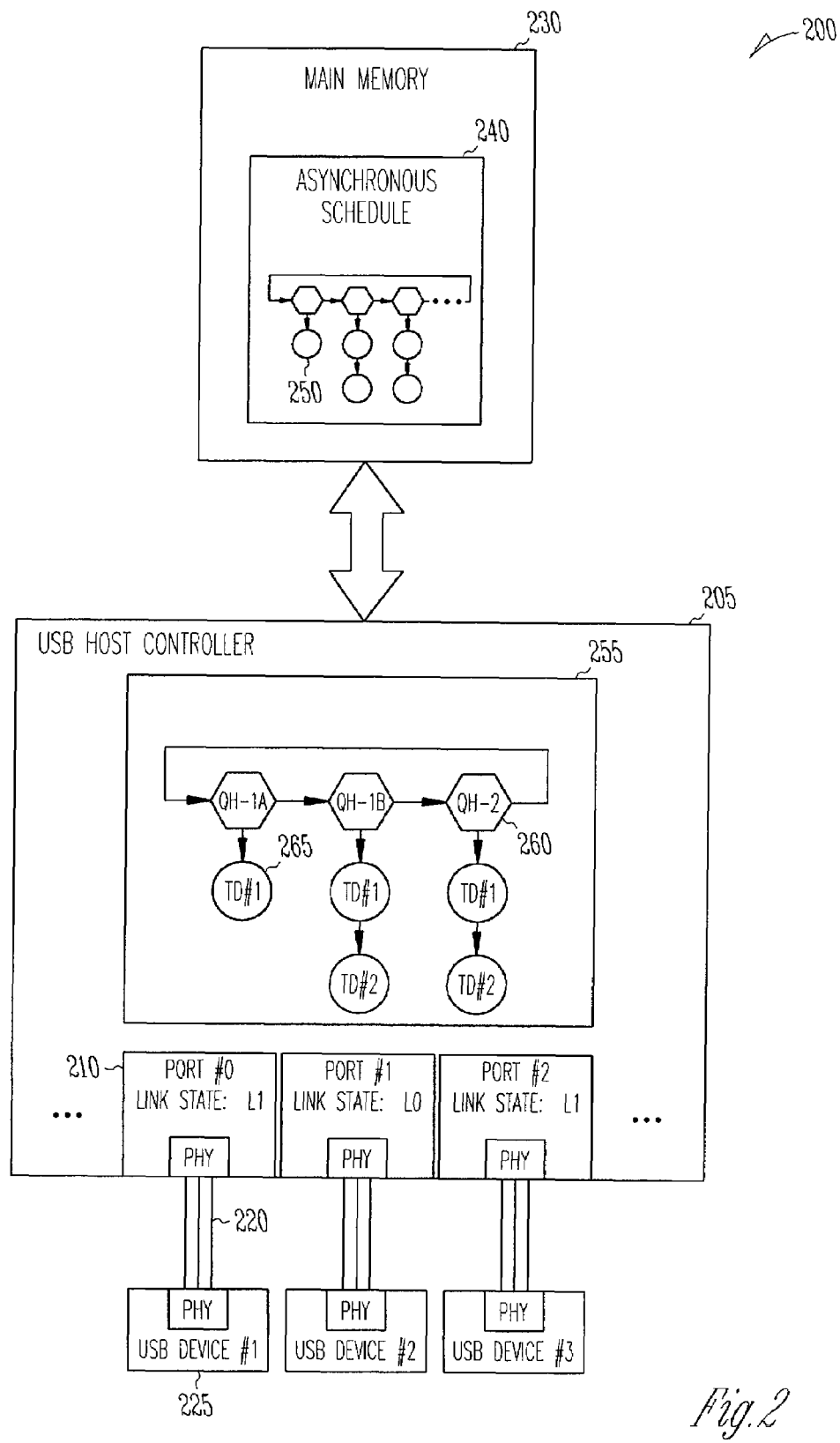
FIG. 2 shows portions of an embodiment of an apparatus to improve power efficiency of a USB during asynchronous transfers.

FIG. 2 shows portions of an embodiment of an apparatus 200 to improve power efficiency of a USB during asynchronous transfers. The apparatus 200 includes a USB host controller 205 and one or more USB ports 210 that communicate over a serial link 220 with a USB device 225. In some embodiments, one or more serial links 220 include a wireless link, and the USB port 210 communicates wirelessly with the USB device 225. The power efficiency is improved by limiting usage of the asynchronous transfer schedule stored in memory 230. This allows data transfers to be initiated without accessing the memory 230.

The USB host controller 205 is coupled to a memory 230 and also includes a local memory buffer 255. The memory 230 is remote from the USB host controller, such as a main memory for example. In some embodiments, the memory 230 includes random access memory (RAM). In some embodiments, the memory 230 includes dynamic random access memory (DRAM). In some embodiments, the memory 230 includes static random access memory (SRAM). In some embodiments, the memory 230 includes flash memory. In some embodiments, the local memory buffer 255 includes RAM, DRAM, SRAM, or flash memory, or any combination of RAM, DRAM, SRAM, and flash memory. The USB host controller 205 limits access to the asynchronous schedule 240 stored in the memory 230 by storing one or more asynchronous schedule structures in the local memory buffer 255. In some embodiments, an entire asynchronous schedule 240 is stored in the local memory buffer 255.

An endpoint with an asynchronous transfer is serviced using the structure or structures stored in the local memory buffer 255 instead of accessing the memory 230. This reduces the number of accesses to the asynchronous schedule 240 during periods of relative schedule stability (i.e., software is not changing the asynchronous schedule 240 in the memory 230). Once the asynchronous schedule 240 in the memory 230 is changed, structures stored in the local memory buffer 255 will have to be updated to maintain consistency with the structures in the memory 230.

According to some embodiments, one or more asynchronous schedule structures are stored in an abridged, or condensed, form in local memory buffer 255. In some embodiments, an asynchronous schedule structure stored in local memory buffer 255 includes an endpoint queue head 260 and any elements necessary to initiate the asynchronous transfer, such as abridged queue heads 260 and transfer descriptors 265. Storing abridged versions of the main memory transfer descriptors 250 reduces the amount of memory required for the local memory buffer 255. A flag or other indication can be used to indicate a buffer full condition to the USB host controller 205. A full local memory buffer 255 may require that the USB host controller 205 access one or more asynchronous schedule structures from memory 230.

In some embodiments, the USB host controller 205 includes an asynchronous pre-fetch engine to pre-fetch an asynchronous schedule structure from the memory 230 for storage in the local memory buffer 255. The primary role of the asynchronous pre-fetch engine is to maintain consistency of the local memory buffer 255 with the asynchronous schedule structures stored in memory 230. The pre-fetch engine fetches structures from the memory 230 and informs the USB host controller 205 to use the local structures until software indicates that a change to the asynchronous schedule 240 in memory 230 will occur. Software informs the pre-fetch engine that a change to the asynchronous schedule 240 is looming. The pre-fetch engine invalidates all structures stored in the local memory buffer 255 and informs the USB host controller 205 to resume using memory 230. The pre-fetch engine re-fetches copies of the structures for storage in the local memory buffer 255 once software indicates the changes have been applied to the asynchronous schedule 240 in memory 230. Thus in some embodiments, the pre-fetching is coordinated by software. In some embodiments, pre-fetching can be limited to when data is already moving from the memory 230 to reduce unnecessary access to the memory 230.

Figure 3:
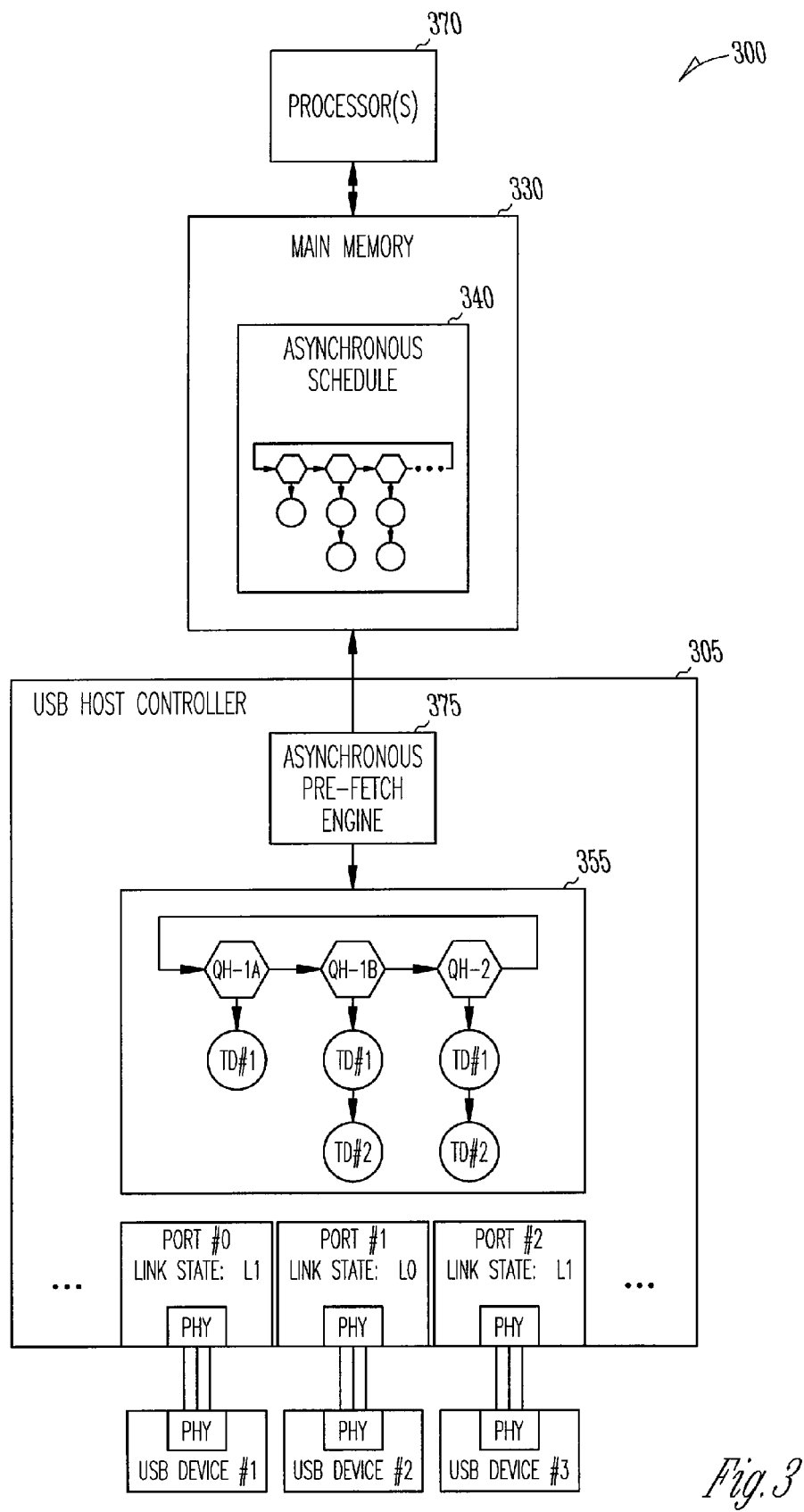
FIG. 3 shows portions of an embodiment of a system that includes one or more processors coupled to a main memory and a USB host controller.

In some embodiments, pre-fetching is enabled by system hardware when all processors in a system are idle. FIG. 3 shows portions of an embodiment of a system 300 that includes one or more processors 370 coupled to a main memory 330 and a USB host controller 305. An asynchronous schedule 340 is stored in the main memory 330. The USB host controller 305 includes a local memory buffer 355 to store one or more asynchronous schedule structures. The USB host controller 305 also includes an asynchronous pre-fetch engine 375 to maintain buffer consistency by pre-fetching one or more asynchronous schedule structures from the main memory 330 for storage in the local memory buffer 355. The processor or processors 370 may change the asynchronous schedule 340.

In some embodiments, the asynchronous pre-fetch engine 375 is enabled to retrieve one or more asynchronous schedule structures, or the entire asynchronous schedule 340, for storage in local memory buffer 355 when all processors 370 are in a non-executing state. However, the processors 370 do not have to all be in the same state. The pre-fetching is opportunistic based on the state or states of the processors 370. In some embodiments, the asynchronous pre-fetch engine 375 retrieves one or more asynchronous schedule structures from main memory 330 when all processors 370 are in a low-power state compatible with one of the non-executing states described in the Advanced Configuration and Power Interface (ACPI) Specification Rev. 3.0, such as the C1, C2, and C3 states for example. The states of the processors 370 can be stored in a set of operational registers for the processors 370, or the states can be communicated directly to the USB host controller 305.

Returning to FIG. 2, another way to limit the use of the asynchronous transfer schedule 240 stored in memory 230 is to reduce the aggressive polling by a USB host controller 205 of those endpoints that NAK frequently or for long periods of time. This reduces the number of accesses to the schedule 240 in memory 230. The polling can be reduced by placing USB ports 210 in a sleep mode to reduce polling of the USB device 225. A remote device wakeup can then be used to indicate that an endpoint is ready for servicing, instead of constantly polling the USB device 225 to determine when the endpoint is ready.

In some embodiments, the USB host controller 205 is configured to limit usage of an asynchronous schedule 240 stored in the memory 230 or the local memory buffer 255 by maintaining one or more USB ports 210 in a sleep state or a low-power link state until detecting some asynchronous notification initiated by a USB device 225 that it is ready for service of an asynchronous transfer endpoint. In some embodiments, the asynchronous notification includes a wake event, such as a resume-signaling indication (a remote wakeup) or a link state transition (e.g., L1 to L0), initiated by the USB device 225. This allows the USB host controller 205 to defer processing asynchronous transfers indefinitely while a USB device 225 is not ready to either provide or consume data. This leads to a more intelligent polling scheme than the power-inefficient polling of a typical USB implementation.

The policy and protocol for placing a port in sleep mode will most likely be specific to a USB implementation. Placing a USB port 210 in a sleep mode may include an exchange of protocol signals between the USB device 225 and the USB host controller 205. For example, the USB host controller 205 transmits a request to a USB device 225 to place the corresponding USB port 210 in a sleep mode and the USB device 225 acknowledges the request with an ACK response.

In some embodiments, the USB host controller 205 places a USB port 210 in a sleep mode after a predetermined number of not ready responses, such as a NAK response packet, are returned by a corresponding USB device 225 for a bulk-IN transfer. In some embodiments, the USB host controller 205 places a USB port 210 in a sleep mode for a bulk-OUT transfer only after a not ready response, such as a NYET response packet, is returned by a corresponding USB device 225 for the transfer. In some embodiments, the USB host controller 205 attempts to place a USB port 210 in a sleep mode each time a transfer descriptor 265 is completed.

In some embodiments, USB devices 225 are allowed to respond with a not ready (NAK) response when the USB host controller 205 attempts to place a corresponding USB port 210 in a sleep mode. Placing a USB port 210 in a sleep mode typically includes a protocol exchange to place a port in a sleep mode, a minimum amount of time that a port is required to stay in sleep mode, and time to transition out of the sleep mode. This protocol exchange adds a delay that could cause a buffer to overflow. For example, a USB device 225 may include a wireless network adapter connected at a very high rate. If the USB device 225 is receiving data at a very high data rate and its receive buffer is nearly full, the USB device 225 will almost immediately be ready to send the data for a bulk-IN transfer to the USB port 210. The delay from the protocol overhead involved with placing a device in sleep mode, and transitioning out of sleep mode, could cause the buffer on the USB device 225 to overflow and in this case the bus protocol may allow the USB device 225 to deny (e.g., NAK) the request to place the USB port 210 in sleep mode if one or more asynchronous bulk-IN transfers are pending or will be immediately pending for an endpoint of the USB device 225. In some embodiments, the USB host controller 205 attempts to place a USB port 210 in a sleep mode periodically, such as by transmitting a request to place a USB port 210 in a sleep mode every millisecond for example.

In some bus implementations, a USB device 225 that does not support a sleep mode may be connected to a USB port 210. Such a device may be of an older type and is sometimes referred to as a legacy device. In some embodiments, the local memory buffer 255 of the USB host controller 205 of FIG. 2 includes a field for storing an indication of whether a connected USB device 225 supports a sleep mode. This allows the USB host controller 205 to manage the USB device 225 without having to access memory 230 or without having to poll the USB device 225 to determine whether the device supports sleep mode.

Figure 4:
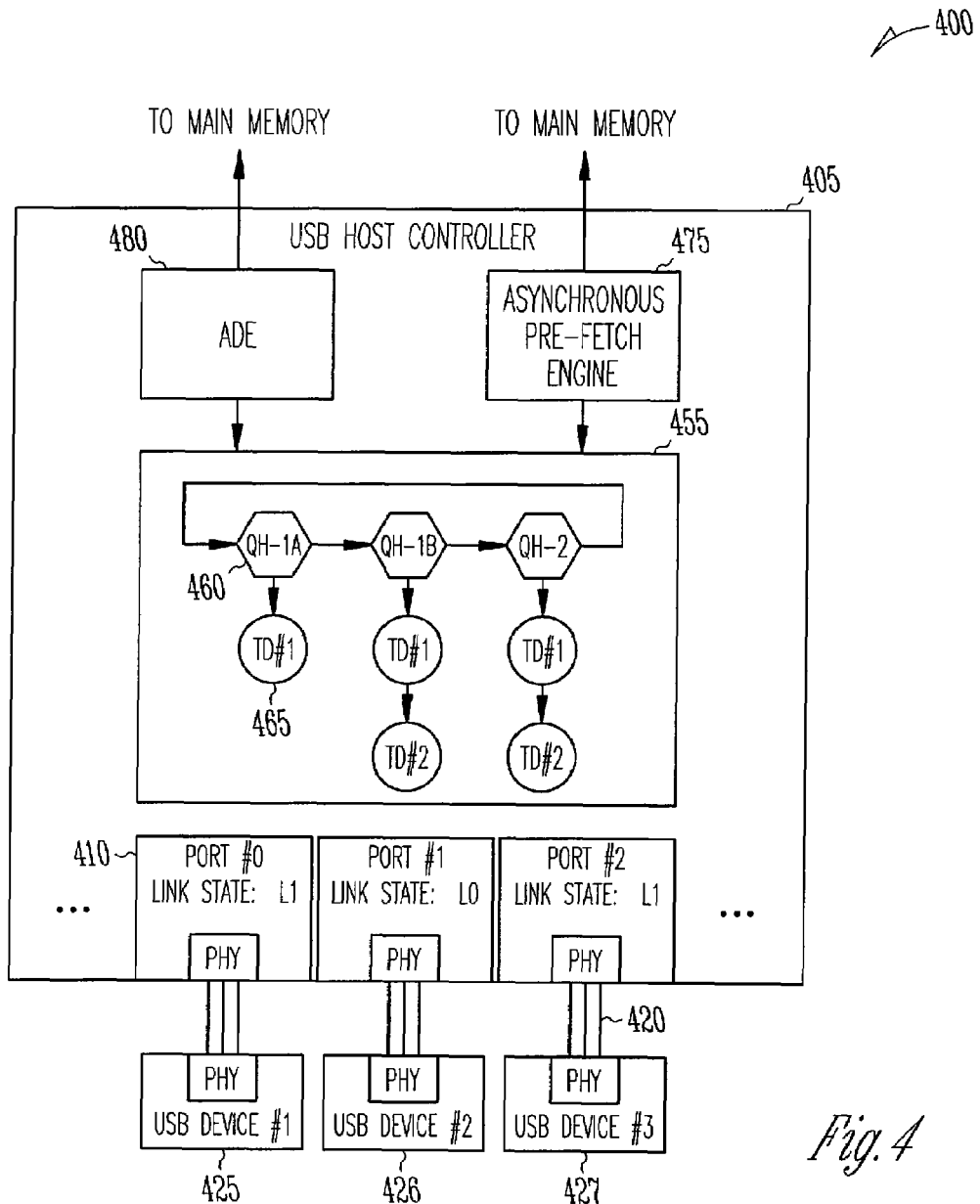
FIG. 4 shows portions of another embodiment of an apparatus to improve power efficiency of a USB during asynchronous transfers.

FIG. 4 shows portions of another embodiment of an apparatus to improve power efficiency of a USB during asynchronous transfers. The apparatus 400 includes a USB host controller 405, an asynchronous pre-fetch engine 475, and an asynchronous schedule direct memory access (DMA) engine, or ADE 480. The ADE 480 transfers data for asynchronous bulk and control transfers between a USB port 410 and main memory. Each structure in the local memory buffer 455 corresponds to an endpoint transfer descriptor and includes all elements required for the USB host controller 405 to initiate bulk and control transfers without accessing main memory. Once data is actively moving, the ADE 480 accesses main memory.

The ADE 480 checks the status of a serial link 420 prior to initiating execution of an asynchronous bulk transfer. Bulk transfers should not be generated for any USB port 410 residing in a sleep mode. Attempts to poll the device will time out because of no response. If a predetermined number (e.g., three) of consecutive attempts result in an error, the USB host controller 405 stops the poll attempts and returns an error to software. In some embodiments, the error is returned to software by marking an error in the transfer descriptor and writing the results back to the schedule in main memory. If the ADE 480 detects that a USB port 410 is in a sleep mode, execution of the asynchronous transfer endpoint corresponding to the USB device 425 is deferred. An asynchronous transfer endpoint corresponding to a USB device 425 is executed if the ADE 480 detects that the corresponding USB port 410 is in an active state. In certain scenarios, the ADE 480 needs to wake a USB port 410 to an active state, such as the first time software adds a transfer to the asynchronous schedule.

An example is helpful to illustrate the techniques of buffering an asynchronous schedule and placing USB ports 410 in a low-power state. In FIG. 4, a sleep state of a USB port 410 is referred to as L1 and an active state as L0. Device initiated wake events bring the ports out of sleep mode. Other asynchronous notification mechanisms such as a side-band interrupt could be used. Three USB devices 425, 426, and 427 are shown and the first and second devices have queue heads 460 and transfer descriptors 465 defined in the asynchronous schedule structure in local memory buffer 455.

The first USB device 425 is configured with two active endpoints: one bulk-IN transfer associated with queue head QH-1a, and one bulk-OUT transfer associated with queue head QH-1b. Various transfer descriptors 465 are linked to these endpoints but their execution is currently deferred because the USB port 410 resides in a low-power sleep mode L1. A USB device 425 initiated wake event (resume from L1) will be interpreted by the USB host controller 405 as an asynchronous flow control event indicating that the device has an endpoint that is now ready to transfer data. The USB host controller 405 will activate processing for all associated transfer descriptors 465. The USB host controller 405 may also cause the USB port 410 to exit sleep mode in certain cases to reactivate transfer execution, such as when a newly added queue head and associated transfer descriptors 465 are detected for this USB device 425 in the asynchronous schedule for example.

The second USB device 426 is configured with a single active bulk-IN endpoint associated with queue head QH-2 and several transfer descriptors 465 linked to it. The endpoint is not immediately ready to produce data as the USB device 426 has recently NAKed transfer requests. This USB device 426 is in the active L0 state because: i) it either does not support sleep mode L1 (i.e., it is a legacy device); ii) it recently NAKed an L1 entry request (e.g., data will be available very soon); or iii) a transition to the active L0 state has not been initiated by the USB host controller 405.

The third USB device 427 is in the L1 state and does not have an active bulk or control transfer endpoint (i.e., there are no endpoint associated queue heads or transfer descriptors 465 in the asynchronous schedule structure in the local memory buffer 455).

Bulk-transfer deferring allows the USB host controller 405 to defer processing of asynchronous bulk transfers indefinitely while all USB devices 425, 426, 427 are not ready to produce or consume data. For example, no transfers for either endpoint on the first USB device 425 would be executed until the USB device 425 resumes to the L0 state. If the second USB device 426 (QH-2) also supported the L1 sleep mode the USB host controller 405 could dynamically idle the ADE 480 while all endpoints for these devices were being deferred (i.e., all associated ports reside in an L1 sleep state or a deeper sleep state).

As discussed previously, the policy for a USB host controller 405 to request a device to transition to the L1 state is implementation-specific. For example, policy may only initiate entry to the L1 state following a successive number of NAK responses specified by a NAK Counter Reload (RL) field for bulk-IN transfers, or immediately following a NYET for a bulk-OUT transfer. USB devices 425, 426, and 427 are allowed to NAK entry to L1 but should do so only when the transitional delay could cause device-side buffering to overflow, or when the device will become immediately available. The USB host controller 405 will likely include some policy to retry entry to the L1 state, such as immediately trying entry after completing a TD, or periodically trying to enter L1 for example.

Bulk-transfer buffering allows the USB host controller 405 to avoid frequent accesses to main memory during periods of relative schedule stability. This is particularly useful when the USB host controller 405 is waiting for a legacy device to become ready, such as when a USB device 425 endpoint continually responds with NAK responses to a request. Abridged versions of bulk and control transfer descriptors 465 can be stored in local memory buffer 455 to minimize main memory accesses. A special flag can be used to indicate that the local memory buffer 455 is full. This could provide an override that forces the USB host controller 405 to use structures stored in main memory.

Bulk-transfer buffering works well in environments where the USB software stack indicates and synchronizes changes to the asynchronous schedule stored in main memory using USB host controller 405 hardware. Here the USB host controller 405 may pre-fetch and use buffered structures until software indicates a change to the structures in main memory, which in many scenarios may occur quite infrequently (e.g., seconds to minutes apart). The USB host controller 405 may also employ opportunistic pre-fetching in the event that software does not provide this level of support, or as a fine-grained technique in the presence of relatively slow or delayed software changes. Here the USB host controller 405 may pre-fetch and use buffered structures whenever software is not running—such as when all system processors reside in a non-executing state (e.g., C1, C2, C3, etc.)—noting that changes to the asynchronous schedule structures are not possible during these periods.

Figure 5:
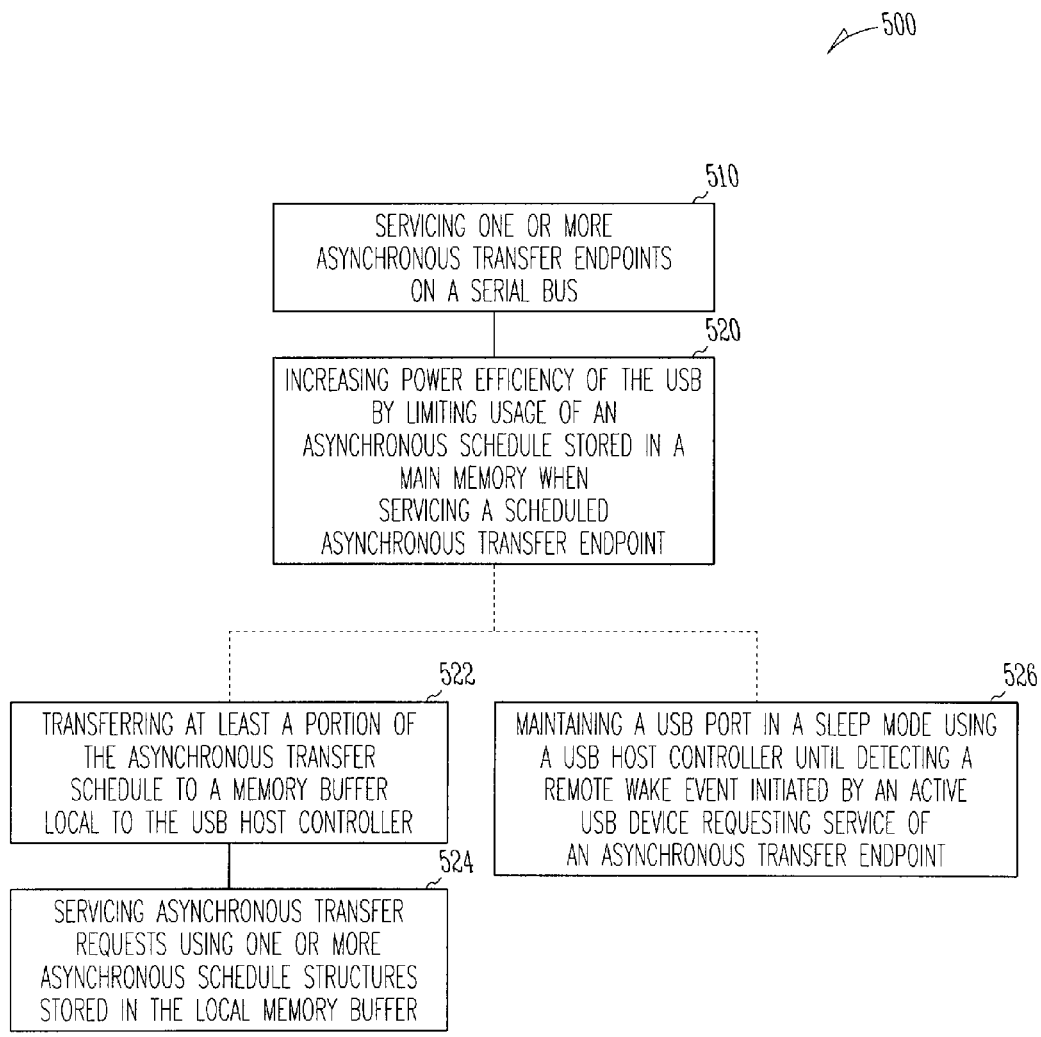
FIG. 5 shows a flow diagram of a method to improve power efficiency of a USB during asynchronous transfers.

FIG. 5 shows a flow diagram of a method 500 to improve power efficiency of a USB during asynchronous transfers. At 510, one or more asynchronous transfer endpoints are serviced on a USB. At 520, power efficiency of the USB is increased by the USB host controller limiting usage of the asynchronous schedule stored in the main memory when servicing the scheduled asynchronous transfer endpoints.

In some embodiments, limiting usage of an asynchronous schedule includes transferring at least a portion of the asynchronous schedule to a memory buffer local to the USB host controller at 522, and servicing asynchronous transfer requests using one or more asynchronous schedule structures stored in the local memory buffer at 524. In some embodiments, the asynchronous schedule structure stored in local memory buffer includes an endpoint queue head and any elements, such as at least one transfer descriptor, necessary to initiate the asynchronous transfer.

In some embodiments, the method 500 includes maintaining consistency between structures stored in the local memory buffer and main memory by software-coordinated pre-fetching or opportunistic pre-fetching of structures from main memory to a local memory buffer. Software-coordinated pre-fetching includes invalidating locally stored asynchronous transfer structures when a software-specified change is occurring in the asynchronous schedule stored in main memory. Updated copies of the structures are pre-fetched from main memory when software indicates that the changes have been applied to the asynchronous schedule stored in main memory. Opportunistic pre-fetching includes pre-fetching of asynchronous schedule structures stored in main memory when all processors in the system are in a state where software is not executing. The processors do not have to all be in the same state, but only in a non-executing state. In some embodiments, pre-fetching occurs when all processors are in a low power state. In some embodiments, system hardware provides an indication to the USB host controller that all the processors are in such a state.

In some embodiments, limiting usage of an asynchronous schedule includes, at 526 in FIG. 5, maintaining a USB port in a sleep mode using a USB host controller until detecting a wake event initiated by an active bus device requesting service of an asynchronous transfer endpoint. The USB port remains in sleep mode until a USB device indicates through some asynchronous notification that it is ready for service of an asynchronous transfer endpoint. In some embodiments, the asynchronous notification includes a remote wake event, such as an interrupt signal, initiated by the USB device. Thus, the polling arrangement typically used in USB implementations is overlaid or substituted with an interrupt scheme.

Because a USB port can be placed in a sleep mode, service to an asynchronous schedule stored in main memory is limited by deferring execution of an asynchronous transfer endpoint if a corresponding USB port is in the sleep mode. The asynchronous transfer endpoint is executed if the corresponding USB port is active.

Typically, the fact that a USB port is going to be placed in sleep mode needs to be communicated to a USB device. In some embodiments, a USB implementation includes a protocol for placing a USB port in a sleep mode. For example, a USB host controller transmits a request to a USB device to place the USB port corresponding to the device in a sleep mode. The USB device then acknowledges the request. When the USB device is ready to either transmit data to the USB host controller or to consume data transmitted from the controller, the USB device initiates a wake-up event.

In some embodiments, the USB host controller places a USB port in a sleep mode after a predetermined number of not-ready signals are returned by a corresponding USB device while the USB host controller is waiting for data from an asynchronous bus transfer. In some embodiments, the USB host controller places a USB port in a sleep mode during an asynchronous transmission of data, such as a bulk-OUT transfer, to a USB device only when a not-ready signal is returned by the USB device.

In some embodiments, the USB host controller attempts to place a USB port in a sleep mode each time an element of an asynchronous transfer structure, such as a transfer descriptor for example, is completed. In some embodiments, the USB host controller attempts to place a USB port in a sleep mode periodically, such as by transmitting a request to a bus device to place a corresponding USB port in the sleep mode every millisecond for example.

In some embodiments, USB devices are able to deny a request from the USB host controller to place a corresponding USB port in sleep mode. A protocol exchange to place a port in a sleep mode requires a delay for the sleep transaction to be implemented. If the USB host controller is servicing an endpoint that is asynchronously transferring data to the USB host controller, such as a bulk-IN transfer in a USB, a buffer of the USB device may be nearly full. Placing the USB port in sleep mode may cause the buffer to overflow. Therefore, the USB device is able to deny the request for sleep mode in some embodiments, if data for an asynchronous transfer, such as a bulk-IN transfer in a USB, is pending or is immediately pending.

The embodiments of the method 500 described herein can be implemented in software. The software comprises computer executable instructions stored on computer readable media such as memory or other type of storage devices. This includes remote storage devices where the instructions are downloadable via the internet or other network to a machine for processing. Further, such methods may correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

The embodiments described herein reduce power consumed by asynchronous transfers over a USB. This is especially important for battery powered mobile devices. A significant amount of power is used to poll USB devices while waiting for a response and to frequently access main memory for servicing the transfers and checking the transfer status.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually, collectively, or both by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own.

What is claimed is:

1. Apparatus comprising:
   a memory; and
   a universal serial bus (USB) host controller coupled to the memory, wherein power efficiency of the USB during asynchronous transfers is increased by the USB host controller limiting usage of an asynchronous schedule stored in the memory when servicing a scheduled asynchronous transfer endpoint.

2. The apparatus of claim 1, further including a local memory buffer local to the USB host controller, wherein the USB host controller limits access to the asynchronous schedule stored in the memory by storing one or more asynchronous schedule structures in the local memory buffer and by servicing an asynchronous transfer endpoint of at least one bus device using the asynchronous schedule structures stored in the local memory buffer.

3. The apparatus of claim 2, wherein the local memory buffer includes a field for storing an indication whether a USB device in communication with the USB host controller supports a sleep mode.

4. The apparatus of claim 2, wherein a stored asynchronous schedule structure includes an endpoint queue head and any elements necessary to initiate the asynchronous transfer.

5. The apparatus of claim 2, further including:
   one or more processors coupled to the memory; and
   wherein the USB host controller includes an asynchronous pre-fetch engine to pre-fetch one or more asynchronous schedule structures from the memory for storage in the local memory buffer, and wherein the pre-fetch engine is enabled when all processors are in a non-executing state.

6. The apparatus of claim 2, wherein the USB host controller includes an asynchronous pre-fetch engine to pre-fetch an asynchronous schedule structure from the memory for storage in the local memory buffer, and wherein the pre-fetch engine invalidates an asynchronous schedule structure in the local memory buffer prior to a change occurring in the asynchronous schedule stored in memory and pre-fetches an asynchronous schedule structure from memory after the change is applied.

7. The apparatus of claim 1, wherein the USB host controller includes one or more USB ports for communicating with bus devices, and wherein the USB host controller is configured to limit service of an asynchronous schedule stored in the memory by maintaining a USB port in a sleep mode until detecting a wake event initiated by an active bus device requesting service of an asynchronous transfer endpoint.

8. The apparatus of claim 7, wherein the USB host controller includes an asynchronous direct memory access engine (ADE), wherein the ADE is configured to defer execution of an asynchronous transfer endpoint if a corresponding USB port is in the sleep mode, and execute an asynchronous transfer endpoint if a corresponding USB port is in an active mode.

9. The apparatus of claim 7, wherein the USB host controller is configured to periodically transmit a request to a bus device that supports the sleep mode to place a corresponding USB port in the sleep mode.

10. The apparatus of claim 9, wherein the bus device is configured to deny the request to place the USB port in sleep mode when one or more asynchronous bulk-IN transfers are pending or will be immediately pending for an endpoint of the bus device.

11. The apparatus of claim 7, wherein the USB host controller is configured to only place a USB port in a sleep mode when servicing an asynchronous bulk-OUT transfer or control transfer when the receiving bus device responds with a signal indicating that the device is not ready to consume the asynchronous transfer.

12. The apparatus of claim 1, wherein the USB host controller includes one or more ports that communicate wirelessly with a bus device.

13. A system comprising:
    a random access memory (RAM);
    at least one processor coupled to the RAM; and
    a USB host controller coupled to the RAM and the processor, wherein power consumed by the USB during asynchronous transfers is reduced by the USB host controller limiting usage of an asynchronous schedule stored in the RAM when servicing a scheduled asynchronous transfer endpoint.

14. The system of claim 13 further including a memory local to the USB host controller, wherein the USB host controller limits access to the asynchronous schedule stored in the RAM by storing at least a portion of the asynchronous schedule in the memory local to the USB host controller and servicing an asynchronous transfer endpoint of at least one bus device, wherein the asynchronous transfer endpoint is stored in the memory local to the USB host controller.

15. The system of claim 14, wherein the USB host controller includes one or more ports for communicating with a bus device, and wherein the USB host controller is configured to defer access to the RAM by maintaining a USB port in a sleep mode until detecting a wake event initiated from a corresponding active bus device requesting service of an asynchronous transfer endpoint.

16. A method comprising:
    servicing one or more asynchronous transfer endpoints on a universal serial bus (USB); and increasing power efficiency of the USB by limiting usage of an asynchronous schedule stored in a memory when servicing a scheduled asynchronous transfer endpoint.

17. The method of claim 16, wherein limiting usage of an asynchronous schedule includes transferring at least a portion of the asynchronous schedule to a memory buffer local to a USB host controller and servicing asynchronous transfer requests using one or more asynchronous schedule structures stored in the local memory buffer.

18. The method of claim 17 including maintaining consistency in the local memory buffer by invalidating an asynchronous schedule structure stored in the local memory buffer prior to a change occurring in an asynchronous schedule stored in memory and pre-fetching an asynchronous schedule structure stored in the memory after the change is applied.

19. The method of claim 17 including maintaining consistency in the local memory buffer by enabling pre-fetching of asynchronous schedule structures stored in memory when all processors coupled to the memory and the USB host controller are in a non-executing state.

20. The method of claim 17, wherein transferring at least a portion of the asynchronous schedule to the local memory buffer includes transferring one or more asynchronous schedule structures that include an endpoint queue head and any elements necessary to initiate the asynchronous transfer.

21. The method of claim 16, wherein limiting usage of an asynchronous schedule includes a USB host controller maintaining a USB port in a sleep mode until detecting a wake event initiated by an active bus device requesting service of an asynchronous transfer endpoint.

22. The method of claim 21, wherein limiting usage of an asynchronous schedule includes:
  deferring servicing of an asynchronous transfer endpoint if a corresponding USB port is in the sleep mode; and
  servicing an asynchronous transfer endpoint if a corresponding USB port is in an active mode or the corresponding port is in communication with a bus device that does not support sleep mode.

23. The method of claim 21, including periodically transmitting a request to a bus device to place a corresponding USB port in the sleep mode.

24. The method of claim 23, further including denying the request when one or more asynchronous bulk-IN transfers are pending or will be immediately pending for an endpoint of the bus device.

25. The method of claim 21, wherein limiting usage of an asynchronous schedule includes deferring execution of an asynchronous bulk-OUT transfer or control transfer when a receiving bus device responds with an indication that the bus device is not ready to consume the asynchronous transfer.

26. A computer readable medium with instructions therein, which when processed result in a machine:
  servicing one or more asynchronous transfer endpoints over a USB according to an asynchronous schedule stored in a memory; and
  increasing power efficiency of the USB by limiting access to the asynchronous schedule stored in the memory when servicing the scheduled asynchronous transfer endpoints.

27. The computer readable medium of claim 26, further including instructions, which when processed result in a machine limiting access to an asynchronous schedule by:
  transferring at least a portion of the asynchronous schedule to a memory buffer local to a USB host controller; and
  servicing asynchronous transfer requests using one or more asynchronous schedule structures stored in the local memory buffer.

28. The computer readable medium of claim 26, further including instructions, which when processed result in a machine limiting access to an asynchronous schedule by using a USB host controller to maintain a USB port in a sleep mode until detecting a wake event initiated by an active USB device requesting service of an asynchronous transfer endpoint.

* * * * *